United States Patent
Cisar et al.

(10) Patent No.: US 6,426,161 B1
(45) Date of Patent: Jul. 30, 2002

(54) LIGHTWEIGHT METAL BIPOLAR PLATES AND METHODS FOR MAKING THE SAME

(75) Inventors: Alan J. Cisar, Cypress; Oliver J. Murphy, Bryan, both of TX (US); King-Tsai Jeng, Fullerton, CA (US); Carlos Salinas, Bryan, TX (US); Stan Simpson, San Pedro; Dacong Weng, Rancho Palos Verdes, both of CA (US)

(73) Assignee: Lynntech, Inc., College Station, TX (US)

( * ) Notice: Subject to any disclaimer, the term of this patent is extended or adjusted under 35 U.S.C. 154(b) by 0 days.

(21) Appl. No.: 09/699,308

(22) Filed: Oct. 25, 2000

Related U.S. Application Data

(63) Continuation of application No. 09/261,642, filed on Mar. 3, 1999, now Pat. No. 6,203,936
(60) Provisional application No. 60/076,813, filed on Mar. 3, 1998.

(51) Int. Cl.$^7$ ................................................ H01M 2/14
(52) U.S. Cl. .......................... 429/38; 429/34; 429/40; 429/41; 429/42; 429/44; 429/210
(58) Field of Search ............................. 429/34, 40, 41, 429/42, 44, 38, 210

(56) References Cited

U.S. PATENT DOCUMENTS

| | | | |
|---|---|---|---|
| 5,538,616 A | | 7/1996 | Arai ........................... 205/126 |
| 5,643,696 A | | 7/1997 | Rowlette .................... 429/210 |
| 6,146,780 A | * | 11/2000 | Cisar et al. ................... 429/34 |

* cited by examiner

Primary Examiner—Bruce F. Bell
(74) Attorney, Agent, or Firm—Streets & Steele; Jeffrey L. Streets

(57) ABSTRACT

Thin, light weight bipolar plates for use in electrochemical cells are rapidly, and inexpensively manufactured in mass production by die casting, stamping or other well known methods for fabricating magnesium or aluminum parts. The use of a light metal, such as magnesium or aluminum minimizes weight and simultaneously improves both electrical and thermal conductivity compared to conventional carbon parts. For service in electrochemical cells these components must be protected from corrosion. This is accomplished by plating the surface of the light weight metal parts with a layer of denser, but more noble metal. The protective metal layer is deposited in one of several ways. One of these is deposition from an aqueous solution by either electroless means, electrolytic means, or a combination of the two. Another is deposition by electrolytic means from a non-aqueous solution, such as a molten salt.

11 Claims, 1 Drawing Sheet

LIGHTWEIGHT METAL BIPOLAR PLATES AND METHODS FOR MAKING THE SAME

This is a continuation of copending application (s) Ser. No. 09/261,642 filed on Mar. 3, 1999 now U.S. Pat. No. 6,203,936, which claims the benefit of Ser. No. 60/076,813 filed Mar. 3, 1998.

FIELD OF THE INVENTION

The present invention relates to bipolar plates between adjacent electrochemical cells. More particularly, the invention relates to lightweight bipolar plates and methods for their construction.

BACKGROUND OF THE INVENTION

Most of the components currently used in proton exchange membrane (PEM) fuel cells are derived from designs originally developed for use in phosphoric acid fuel cells (PAFC), and are not optimal for the higher performance of PEM fuel cells.

By the mid-70s, components consisting entirely of carbon were made for use in PAFC's operating at temperatures in the 165–185° C. range. One particular manufacturer has made bipolar plates by molding a mixture of graphite powder (approximately 67 wt %) and phenolic resin (approximately 33 wt %) and carefully heat-treating to carbonize the resin without introducing excessive porosity by rapid degassing. Typically, heat treatment to 900° C. was sufficient to give the required chemical, physical and mechanical properties. The bipolar plates were molded flat and were machined to produce the required fluid distribution or collection grooves (or cooling grooves for the bipolar plate). Somewhat later in time, grooved plates were molded in a die (which was slightly oversized to compensate for shrinkage during baking) to produce a glassy graphitic, carbon-composite plate. However, while carbon/graphite bipolar plates are effective, they are expensive and, because it is difficult to produce thin carbon based bipolar plates, stack built with these plates tend to be heavy and bulky.

One alternative for overcoming these limitations is to use a moldable graphite-based composite that does not have to be carbonized. Graphite powder, which serves as the conductor, is bonded into a rigid piece with a polymer matrix. The graphite retains its conductivity and corrosion resistance, and the polymer binder, which must also be stable under PEM operating conditions, allows the plate to be formed by conventional polymer forming processes. This approach has distinct limitations. When the graphite is diluted with the polymer, its conductivity, already lower than any metal, is reduced even further. A seven kilowatt stack with pure graphite bipolar plates would be expected to have a 16 Watt internal resistive loss. When the graphite is dispersed in a polymer matrix, this loss will be larger.

Yet another example of a bipolar plate is a solid titanium metal sheet. The titanium is resistant to corrosion in many applications, provides greater electronic conductivity than does graphite, and can be made in relatively thin sheets. However, titanium is very expensive and relatively heavy itself.

Therefore, there is a need for a lightweight bipolar plate that provides the desired conductivity and can withstand the corrosive environments typically found in fuel cells and the like.

SUMMARY OF THE INVENTION

The present invention relates to bipolar separators or plates positioned between adjacent electrochemical cells, including lightweight bipolar plates and methods for their construction. The invention involves methods for depositing metals onto Mg and Al plates from either an aqueous solution or a non-aqueous solution of molten salts.

In one embodiment of the invention, Pd—Ni alloys can be electroplated from an aqueous solution onto electroless Ni deposits using direct current (DC), pulsed current (PC), and pulse reversal (PR) plating conditions. Using simple PC plating conditions, the size of electrodeposited Ni crystals were, significantly smaller than those obtained using DC plating, thereby, reducing porosity and improving the hardness of the coating. Pulse reversal plating yielded a Ni coating with improved corrosion resistance in various environments, because the most active metal crystals are continuously dissolved during the anodic pulse.

Because of the hydrophilic nature of gas flow channels in metal bipolar plates, the channels may flood with water and hinder the supply of gaseous reactants to the electrodes. Therefore, the surfaces of gas flow channels are preferably hydrophobic to prevent the attachment of water droplets. In order to make the channels hydrophobic, an electroplated metal-PTFE composite coating can be deposited on the surface of the Pd—Ni coating. The unique water repellent property of PTFE particles incorporated into the composite coating will prevent the penetration of liquid water into any pores in the deposited layer which will also aid in preventing corrosion of the metal substrate. The electroplated metal used in the composite coating can be selected from Ru, Pd, and Au.

In a second embodiment of the invention, a non-aqueous plating system, such as a molten salt solution, is used to plate metal onto the substrate. One difficulty associated with an aqueous system for plating an Al or Mg substrate is that the Al and Mg react with water to form an oxide film. Thus, the use of an aqueous plating system requires a multi-step, multi-layer plating process to remove the oxide film and plate the desired metals onto the substrate. By contrast, a non-aqueous solvent that does not react with Al and Mg substrates can be used to plate the desired plating metals directly onto the Mg or Al substrate.

Aluminum chloride ($AlCl_3$) is one example of a covalently bonded compound useful as one component of a molten salt solvent. $AlCl_3$ occurs as the dimer ($Al_2Cl_4$) and will readily combine with almost any free chloride to form a tetrahedral aluminum tetrachloride anion ($AlCl_4$). This covalently bonded ion acts as a large monovalent ion, with the negative charge dispersed over a large volume. The complex salt (such as $NaAlCl_4$) has a far lower melting point than the corresponding simple chlorides. The alkali metal tetrachloroaluminate complex salts ($NaAlCl_4$ and $KAlCl_4$) have been used as moderately high temperature solvents (for example at 150–300° C.) for a variety of purposes, including electrochemistry, spectroscopy, and crystal growth.

Ambient temperature molten salts can also be formed from aluminum chloride. Table 1 lists some of the compounds capable of forming ambient temperature molten salts when combined with aluminum chloride. All of the materials listed are ionic chlorides. With the exception of TMPAC, all have the positive charge delocalized to some degree through a π-conjugated system over a large portion of the volume of the bulky cation. In all cases, the combination of a large cation, with a low charge density and a large anion, with a low charge density, leads to a low melting solid. The combination is an ionic liquid that actually behaves in some respects more like a molecular liquid. Unlike high temperature molten salts, which tend to interact only through non-directional charge-charge interactions, these molten salts are hydrogen bonded liquids with the cations forming a water-like network.

TABLE 1

Compounds that Form Room Temperature Tetrachloroaluminate Salts

| Compound | Formula | Abbr. |
|---|---|---|
| 1-ethyl-3-methylimidazolium chloride | $C_6H_{11}N_2Cl$ | EMIM |
| Triethylphenylammonium chloride | $C_9H_{14}NCl$ | TMPAC |
| 1-methyl-3-ethyl-imidazolium chloride | $C_6H_{11}N_2Cl$ | MEIC |
| 1,3-dimethyl-imidazolium chloride | $C_5H_9N_2Cl$ | |
| 1-methyl-3-propyl-imidazolium chloride | $C_7H_{13}N_2Cl$ | |
| 1-methyl-3-butyl-imidazolium chloride | $C_8H_{15}N_2Cl$ | |
| 1,3-dibutyl-imidazolium chloride | $C_{11}H_{21}N_2Cl$ | |
| 1,2-dimethyl-3-propyl-imidazolium chloride | $C_8H_{15}N_2Cl$ | DMPrICl |
| N-butylpyridinium chloride | $C_9H_{14}NCl$ | BPC |
| N-propylpyridinium chloride | $C_8H_{12}NCl$ | |
| N-ethytpyridinium chloride | $C_7H_{10}NCl$ | |
| N-methylpyridinium chloride | $C_6H_8NCl$ | |

Transition metals are more easily plated from molten salts than reactive metals, since they are more easily reduced than the solvent, instead of being part of the solvent. In molten salts, like in aqueous solutions, the most easily reduced species will be reduced and deposited (plated) first, with that species protecting the solvent from reduction until it is consumed. Some of the materials plated, together with the base used in the solvent system used for plating are listed in Table 2.

TABLE 2

Metals and Alloys Plated from Room Temperature Molten Salts

| Element | Base |
|---|---|
| Co | MEIC |
| Co-Al alloy | MEIC |
| Co | BPC |
| Co-Al alloy | BPC |
| Ni | MEIC |
| Ni-M alloy | MEIC |
| Cu | BPC |
| Pd | MEIC |
| Au | MEIC |
| Ag | MEIC |
| Pb | MEIC |
| Al-Cr alloys | TMPAC |

Some of the elements in Table 2 were plated from acidic melts, others from basic melts. A few have been plated from both acidic and basic melts. The substrates used in these plating tests varied widely as well, with relatively refractory materials such as Pt and glassy carbon common, as well as Al.

Since Al and Mg are generally more electroactive than the metals to be deposited, it is likely that the material initially deposited will be an alloy of Al or Mg and the metal being deposited. As seen in Table 2, these types of alloys have been observed for several elements (Co, Ni, and Cu). In those cases, the careful and continued deposition of the transition metal leads to a pure transition metal surface. The elements were determined to behave in accordance with their position in the electromotive series and an examination of the appropriate binary phase diagram to identify potential for forming intermetallic phases.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
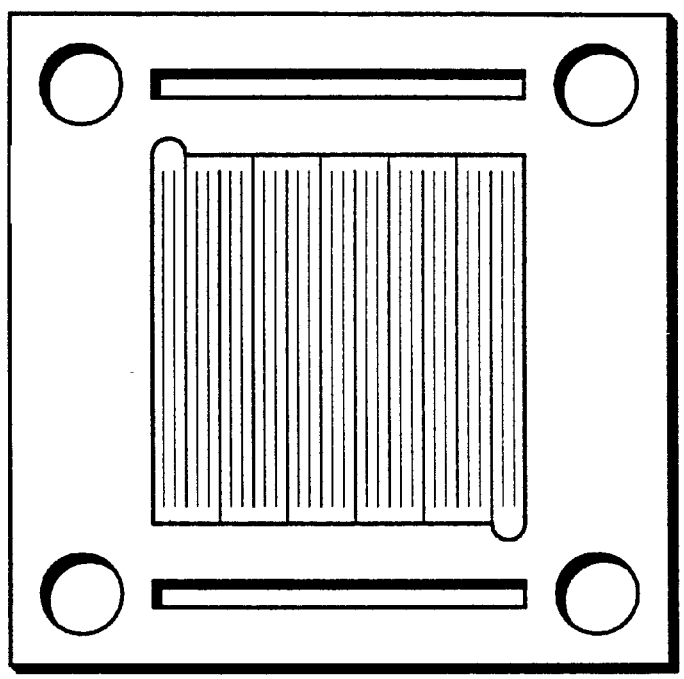
FIG. 1 a front perspective view of a serpentine flow field from a PEM fuel cell.

The present invention relates to light weight bipolar plates for use in electrochemical devices, such as fuel cells. These bipolar plates are made from light metals, such as Al and Mg. An Al or Mg substrate is plated with metals that provide corrosion resistance and high electrical conductivity to the resulting bipolar plate.

Aluminum and magnesium are lightweight alternatives to graphite bipolar plates, because Al and Mg provide much greater electrical conductivity than graphite while having similar densities to graphite. Al and Mg can also be machined easily with better control of shape and thickness than can be achieved with graphite. Al and Mg may also be formed by die casting, which increases manufacturing throughput, and consequently lowers production costs.

TABLE 3

Die Casting Alloy Compositions

| ASTM No. | B380.0 | AZ91D |
|---|---|---|
| Element | wt % | Wt % |
| Al | 82.75–85.75 | 8.3–9.7 |
| Mg | 0.10 | 88.71–91.63 |
| Cu | 3.0–4.0 | 0.03 |
| Fe | 1.3 | 0.005 |
| Si | 7.5–9.5 | 0.05 |
| Mn | 0.50 | 0.15–0.50 |
| Zn | 1.0 | 0.35–1.00 |
| Ni | 0.50 | 0.002 |
| Sn | 0.35 | — |

Al and Mg with no coating are subject to corrosion. Therefore, the surface of these metals A preferably coated with at least one layer of a metal that will impart corrosion resistance without interfering with the electrical or electronic conductivity of the plate. Various plating techniques may be used, such as, displacement Ni and electroless Ni for the first layer of plated metal. The corrosion resistance of electroless nickel-phosphorous alloys is well known and are widely used for corrosion protection of Al and mild steel. Since displacement Ni and electroless Mi deposits are uniform in thickness over all surfaces, irregular shapes can be protected from corrosion in areas where electroplated deposits would be thin or totally lacking, due to current distribution limitations. Electroless nickel-phosphorous, with an amorphous structure, will also help seal the porosity on the surfaces of the Al or Mg substrate.

The rate of the Ni displacement reaction should be carefully controlled by controlling the temperature of the bath and the concentration of the nickel solution. A slow displacement reaction produces fine-grained Ni with uniform surface coverage and strong adherence to Al substrates. Careful selection of the complexing agent, which is typically a multi-functional or hydroxylated carboxylic acid with a short carbon chain, (e.g., DL-malic acid, gluconic acid, citric acid, etc.) and the bath temperature, which is typically between about 50 and about 70° C, gives rise to the desired Ni displacement reaction rate, which should be less than 0.3 $\mu$m/hr.

Electroless Ni coatings deposited at a temperatures less than about 80° C. can exhibit residual stress. The pH of the electroless plating solution has a strong effect on the magnitude of the residual stress. However, known annealing procedures can be used to relieve the stress in electroless Ni deposits. One such annealing procedure involves annealing at about 120° C. for 1 hour in an inert gas environment.

Table 2, above, shows a list of elements which have been plated from room temperature molten chloride salts. In general, the same processes are observed with the corresponding bromide salts, but with no advantage. Some of these elements were plated from acidic ($AlCl_3$ rich, relative to the nitrogen-containing base) melts, others from basic (nitrogen-containing base rich) melts. A few have been plated from both acidic and basic melts. The substrates used in these plating tests varied widely as well, with relatively refractory materials such as Pt and glassy carbon common, as well as Al.

Another embodiment of the invention involves the direct plating of precious metals onto Al and Mg from a room temperature molten salt solvent. This avoids the problems associated with the Al or Mg reacting with the water in the aqueous solvent. Alternatively, a base metal undercoat from room temperature molten salt solvent may be deposited first, followed by plating a precious metal top coat. The precious metal top coat can be deposited from either a second room temperature molten salt solution or an aqueous solution.

Figure 2:
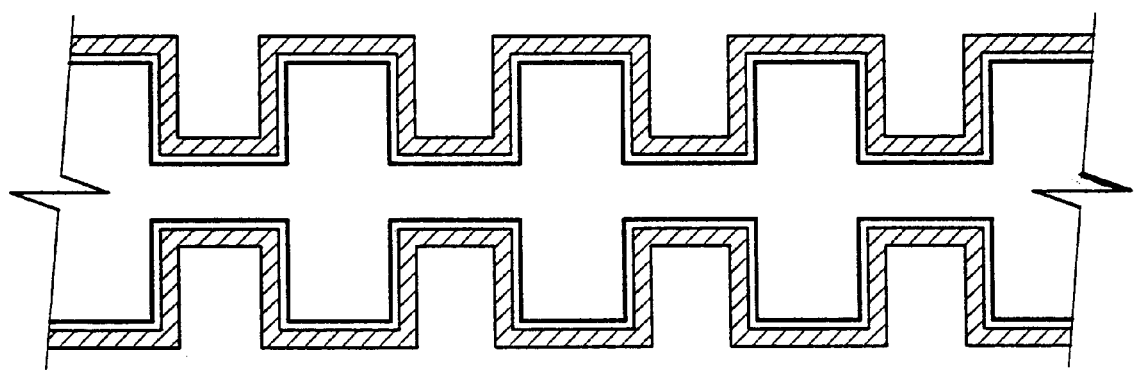
FIG. 2 is a schematic cross-sectional view of the bipolar plate of FIG. 1, showing the contact surfaces plated with precious metal.

One advantage of applying two separate coats is the ability to tailor the coating to the location on the plate. Specifically, when the base metal layer is sufficient to protect the light metal from corrosive attack, but does not furnish good electrical contact, a thin layer of precious metal can be applied only to the contact surfaces. This is easily accomplished simply by plating without making any effort to plate the less accessible parts of the bipolar plate. Some of the metal is deposited in the channels, but most of the metal will remain on the top surfaces as shown in FIG. 2.

As in the aqueous system, Ru and Pd, which are stable in the PEM fuel cell environment, are the elements of choice for the non-aqueous plating system. Both are less expensive than Au on a weight basis and both are one third less dense, thus covering a larger area per unit of material than Au. In addition to the material cost savings, Pd layers are less porous than Au layers, offering better protection from corrosive attack.

Depositing the top coat using conventional aqueous methods has a number of advantages. Most obviously, it permits the use of a wide range of existing, commercially available chemistries. In addition, it allows for the inclusion of PTFE in the final layer, which provides the water repellent properties that are useful in certain fuel cell operations.

The following examples illustrate some of the preferred embodiments of the present invention.

EXAMPLE 1

An aqueous plating process was used to deposit strongly adherent metal films on the surfaces of Al alloys (Al 2024-T3 and Al 7075-T6) in the form of coupons (3"×1"× 1/16") The overall coating process consisted of four main steps: (1) surface pretreatment, (2) displacement Ni deposition, (3) electroless Ni deposition, and (4) Au electroplating. In the surface pretreatment step, the Al alloy coupons were degreased and most of the surface oxide film was removed or etched. The degreasing and etching steps were carried out in an inert gas (Ar) environment free from oxygen.

The pretreatment procedure consisted of the following steps: 1) Sonicating the Al coupon in industrial detergent for 5 min., 2) Rinsing the Al coupon thoroughly with deionized water; 3) Drying and sand blasting the Al coupon; 4) Sonicating the Al coupon in deionized water; 5) Degreasing the coupon in 10% NaOH for 30 sec.; 6) Rinsing the Al coupon thoroughly with deionized water, 7) Etching the Al coupon in 60% $HNO_3$+100 g/L $NH_4F.HF$ for 30 seconds; and 8) Rinsing the Al coupon thoroughly with deionized water. After the surface pretreatment step, Al alloy coupons were rinsed thoroughly with deionized water and exhibited shiny metallic surfaces.

Surface pretreated coupons were quickly immersed in an Ar stirred Ni displacement bath. The composition and operating conditions of the Ni displacement bath are given in Table 7. DL-malic acid was used as the complexing agent and the Ni displacement step was allowed to proceed for approximately 20 min. In this step, Ni metal plated onto freshly exposed Al metal surfaces in an oxygen-free aqueous solution via displacement from solution by dissolving Al atoms. The Ni displacement process gives rise to the deposition of at most a few monolayers of Ni on the surfaces of Al substrates since it is an exponentially decelerating and self-limiting process that coats exposed Al metal but ceases once the Al surface is covered with a thin layer of Ni metal.

TABLE 7

Composition of Nickel Displacement Bath and Plating Conditions

| | |
|---|---|
| $NiSO_4.6 H_2O$ | 0.05M |
| DL-Malic acid | 0.20M |
| Temperature | 60–70° C. |
| pH | 8.0–9.0 |
| Agitation | Ar |

After removing the Al alloy coupons from the Ni displacement bath, they were rinsed thoroughly with deionized water and then immersed in an electroless Ni plating bath. The composition of the electroless Ni bath and the conditions used are given in Table 8. The thin film of Ni deposited from the Ni displacement bath provided catalytic sites for initiation of electroless Ni deposition. The electroless Ni deposition process initially proceeded very vigorously as evidenced by strong gas evolution from the coupon surfaces. In this bath, hypophosphite anions served as a reducing agent, reducing Ni cations and depositing Ni metal on substrates with the concomitant generation of hydrogen gas. The agitation produced by the gas helped to enhance the mass transfer of ionic species and, thus, improve the smoothness of electroless Ni deposits. This process was allowed to proceed for 1–2 hours. The plated Ni was observed to give a bright grayish color to the surfaces of the coupons. From microscopic examinations, the combined thickness of displacement Ni and electroless Ni deposits was of the order of 7 $\mu$m. On completing the electroless Ni deposition process, coupons were sonicated in deionized water for 10 minutes, thoroughly rinsed with deionized water, and dried in air.

In a final coating step, the Al alloy coupons were plated with a layer of Au to enhance corrosion resistance. Prior to applying an electroplated Au layer, the surfaces of the Ni deposits were pretreated either with immersion Au or with a Au strike to facilitate electroplating of Au and improve the adhesion of pure Au deposits to the Al substrate. The Au strike involved the use of a commercial plating solution (EAS solution, available from Engelhard) and was carried out at 80° C. using an applied current density of 50 mA cm$^{-2}$ for 40 seconds. For immersion Au plating, a commercial solution (ATOMEX®,

TABLE 8

Composition of Electroless Nickel Bath and Plating Conditions

| | |
|---|---|
| NiSO$_4$.6H$_2$O | 0.05M |
| glycine | 0.15M |
| NaH$_2$PO$_2$.6H$_2$O | 0.30M |
| Temperature | 70–80° C. |
| pH | 9.5–10 |
| Agitation | Ar | available from Engelhard) was used. The conditions included a temperature of 70–90° C., at a pH of 5.0–5.4, and for a plating time of 10–15 minutes. The Au electroplating was carried out using a commercial Au plating solution (E-56, also available from Engelhard). An applied current density of 50 mA cm$^{-2}$ was used for 20–30 minutes at 70–80° C. A right, reflective surface was obtained after electroplating Au on the surfaces of the coupons. Microscopic examination of cross sectioned coupons revealed that electrodeposited Au layers were compact in appearance and had thicknesses of the order of 20 μm.

EXAMPLE 2

This example illustrates the suitability of plated aluminum for fuel cell use.

To determine the suitability of metal-coated Al alloys for use as bipolar plates in PEM fuel cells, a number of tests were carried out on the coated coupons of Example 1. The tape peel test and surface electrical resistance measurements indicated excellent adhesion between deposited metal layers and Al alloy substrates and the successful removal of electrically resistive Al oxide films. A thermal cycling stress test was carried out by heating specimens in an oven at 100° C. for 1 hour and then quenching the specimens in room temperature (22–25° C.) dilute aqueous nitric acid (pH 2). After 200 quenching cycles, there was no evidence of blistering, debonding, or other deterioration of plated coupons.

The coated coupons were subjected to corrosion tests in aerated dilute aqueous nitric acid solutions (pH 2). The coupons were half immersed in the acid solution and half exposed to the air to simulate the conditions that would be encountered in the cathode of a PEM fuel cell. The first test was carried out at room temperature under open circuit conditions, with blister formation observed at the sample/solution/air three-phase interface after approximately 200 hours of exposure. The second test involved accelerated corrosion under potential polarization using a three-electrode system more closely mimicking the environment in the cathode of a PEM fuel cell. The metal-coated coupons were partially immersed and held at a potential of +1.0 V (NHE) in an acid solution maintained at 60° C. Under these conditions, the best metal-coated coupons failed with the formation of small blisters after approximately 100 hours of exposure. Unplated Al alloy coupons failed almost instantly under these test conditions.

Careful examination of the failure sites indicated that the blisters were the result of pinhole flaws in the metal coating. These flaws were too small to be observed, but large enough to permit the penetration of H$_3$O$^+$ and water molecules, which could then attack the Al and slowly undercut the plated metal until a blister became apparent. These flaws were suspected to have arisen from holidays in the initial Ni displacement coating and may be due to inclusions or inhomogeneities in the Al alloy substrate. Each of the subsequent plated layers increased the overall coating thickness, and probably partially covered the initial flaws, but none of the additional layers was perfect, so that even the smallest flaw could lead to eventual failure.

The results described above show that the plating processes employed significantly improved the corrosion resistance of commercially available Al alloys. It must be pointed out that these are accelerated tests and the test solution used, namely, aerated aqueous nitric acid having a pH of 2, is much more aggressive than the environment that would be encountered in the air fed cathode compartment of a PEM fuel cell.

EXAMPLE 3

This example illustrates plating from a room temperature molten salt solution.

An aluminum coupon is immersed in a molten salt bath consisting of a 1:1 mole ratio mixture of MEIC and AlCl$_3$ at 25° C. in an argon filled glove box. A platinum counter electrode is also placed in the bath and a source of electrical current attached to both the coupon and the platinum electrode. The aluminum coupon is polarized relative to the platinum electrode in such a manner that the flow of electrical current will cause the dissolution of a small portion of the aluminum from the surface, and the current switched on. This process serves to remove the coating of aluminum oxide normally present on the surface of aluminum.

A 3 mole percent solution of NiCl$_2$ in MEIC-AlCl$_3$ is also prepared in the argon filled glove box. The cleaned aluminum coupon is placed in the nickel-containing bath, along with a nickel wire counter electrode,. A potential is imposed on the coupon and the nickel wire so as to cause nickel from the solution to deposit on the surface of the aluminum, and nickel from the wire to dissolve into the molten salt. As the flow of current continues, an initial layer of nickel-aluminum alloy is formed on the surface of the aluminum coupon. This alloy serves as the base for the deposition of a layer of pure nickel, which occurs as the deposition continues.

After the deposition is terminated, the coupon, now with a layer of nickel on its surge is washed with acetonitrile to remove any traces of the plating bath At this point the coupon is ready to be removed from the argon atmosphere and receive a top coat of ruthenium prior to testing for corrosion resistance.

While the foregoing is directed to the preferred embodiments of the present invention, other and further embodiments of the invention may be devised without departing from the basic scope thereof and the scope thereof is determined by the claims which follow.

We claim:

1. A lightweight bipolar plate comprising:

gas flow channels and contact surfaces, characterized in that the bipolar plate comprises a light metal selected from aluminum, magnesium and mixtures thereof, and further characterized in that surfaces of the gas flow channels are hydrophobic.

2. The bipolar plate of claim 1, further comprising:

a thin layer of precious metal applied to the contact surfaces.

3. The bipolar plate of claim 1, wherein gas flow channels are made hydrophobic by electroplating the surfaces of the channels with a metal-polytetrafluoroethylene composite coating.

4. A lightweight bipolar plate comprising:

a fluid distribution channel and a contact surface, comprising a light metal selected from aluminum, magnesium and mixtures thereof, wherein one or more surfaces of the fluid distribution channel are hydrophobic.

5. The bipolar plate of claim 4, further comprising:

a thin layer of precious metal applied to the contact surface.

6. The bipolar plate of claim 4, wherein the one or more surfaces of the fluid distribution channel are made hydrophobic by electroplating the one or more surfaces with a metal-polytetrafluoroethylene composite coating.

7. The bipolar plate of claim 4, wherein the fluid distribution channel and the contact surface are essentially parallel to each other.

8. The bipolar plate of claim 4, further comprising a plurality of alternating fluid distribution channels and contact surfaces formed on at least one side of the bipolar plate.

9. The bipolar plate of claim 4, wherein the fluid distribution channel and the contact surface form an essentially serpentine flow field.

10. A lightweight bipolar plate comprising:

a fluid distribution channel; and a contact surface, wherein a surface of the fluid distribution channel is coated with a metal-polytetrafluoroethylene composite coating.

11. The bipolar plate of claim 10, wherein the contact surface is coated with a metal-polytetrafluoroethylene composite coating.

* * * * *